(12) United States Patent
Pal

(10) Patent No.: US 10,278,215 B2
(45) Date of Patent: Apr. 30, 2019

(54) METHOD AND SYSTEM FOR RESOLUTION OF COLLISION OF PHYSICAL CELL IDENTIFIER (PCI)

(71) Applicant: Wipro Limited, Bangalore (IN)

(72) Inventor: Shyam Sundar Pal, Kolkata (IN)

(73) Assignee: Wipro Limited, Bangalore (IN)

( * ) Notice: Subject to any disclaimer, the term of this patent is extended or adjusted under 35 U.S.C. 154(b) by 33 days.

(21) Appl. No.: 15/446,480

(22) Filed: Mar. 1, 2017

(65) Prior Publication Data
US 2018/0206150 A1    Jul. 19, 2018

(30) Foreign Application Priority Data
Jan. 13, 2017   (IN) .............................. 201741001466

(51) Int. Cl.
| H04L 5/00 | (2006.01) |
| H04W 8/26 | (2009.01) |
| H04W 16/00 | (2009.01) |
| H04W 74/08 | (2009.01) |
| H04B 17/327 | (2015.01) |
| H04B 17/345 | (2015.01) |
| H04B 17/373 | (2015.01) |

(52) U.S. Cl.
CPC ...... *H04W 74/0858* (2013.01); *H04B 17/327* (2015.01); *H04B 17/345* (2015.01); *H04B 17/373* (2015.01); *H04L 5/005* (2013.01); *H04W 8/26* (2013.01); *H04W 16/00* (2013.01)

(58) Field of Classification Search
CPC .. H04W 74/0858; H04W 28/046; H04L 5/005
See application file for complete search history.

(56) References Cited

U.S. PATENT DOCUMENTS

| 8,838,090 B2 | 9/2014 | Gunnarsson et al. |
| 9,264,891 B2 | 2/2016 | Li et al. |
| 2010/0020710 A1* | 1/2010 | Gupta .................. H04J 11/0093 370/252 |
| 2012/0275315 A1 | 11/2012 | Schlangen et al. |

(Continued)

OTHER PUBLICATIONS

Lim, J et al., "Management of Neighbor Cell Lists and Physical Cell Identifiers in Self-Organizing Heterogeneous Networks", Hournal of communications and Networks, VO 13, No. 4, Aug. 2011, pp. 367-376.*

(Continued)

*Primary Examiner* — Derrick W Ferris
*Assistant Examiner* — Farhad Ali
(74) *Attorney, Agent, or Firm* — Finnegan, Henderson, Farabow, Garrett & Dunner, LLP

(57) ABSTRACT

A method and a system are described for resolution of collision of Physical Cell Identifier (PCI) between a plurality of base stations. The method includes determining a value of a Physical Cell Identifier Collision Margin (PCICM). The method includes detecting a PCI collision among a plurality of base stations based on the determined PCICM value. In an embodiment, the plurality of base stations may include a Serving Base Station (SBS) and one or more Neighboring Base Stations (NBS). The method includes estimating a relative distance between the SBS and each of the one or more NBS. The method includes reconfiguring a new PCI value associated with the SBS based on the estimated relative distance.

17 Claims, 5 Drawing Sheets

(56) References Cited

U.S. PATENT DOCUMENTS

| | | | | |
|---|---|---|---|---|
| 2015/0063137 A1* | 3/2015 | Shen | ................ | H04W 24/10 370/252 |
| 2015/0245221 A1* | 8/2015 | Yiu | ................ | H04W 28/24 455/446 |
| 2016/0143068 A1 | 5/2016 | Chaudhuri et al. | | |
| 2016/0212632 A1 | 7/2016 | Katamreddy et al. | | |

OTHER PUBLICATIONS

3GPP TS 36.331 v8.9.0, "3$^{rd}$ Generation Partnership Project; Technical Specification Group radio Access Network; Evolved Universal Terrestrial Radio Access (E-UTRA); Requirements for support of radio resource management (Release 8)", Mar. 2010, *3GPP*, pp. 1-138.

3GPP TS 36.331 v8.17.0, "3rd Generation Partnership Project; Technical Specification Group Radio Access Network; Evolved Universal Terrestrial Radio Access (E-UTRA); Radio Resource Control (RRC); Protocol specification (Release 8)", Jun. 2012, *3GPP*, pp. 1-215.

3GPP TS 36.321 v8.0.0, "3rd Generation Partnership Project; Technical Specification Group Radio Access Network; Evolved Universal Terrestrial Radio Access (E-UTRA); Medium Access Control (MAC); protocol specification (Release 8)", Dec. 2007, *3GPP*, pp. 1-23.

3GPP TS 36.211 v12.0.0, "3rd Generation Partnership Project; Technical Specification Group Radio Access Network; Evolved Universal Terrestrial Radio Access (E-UTRA); Physical channels and modulation (Release 12)", Dec. 2013, *3GPP*, pp. 1-120.

3GPP TS 23.401 v8.16.0, "3rd Generation Partnership Project; Technical Specification Group Services and System Aspects; General Packet Radio Service (GRPS) enhancements for Evolved Universal Terrestrial Radio Access Network (E-UTRAN) access (Release 8)", Mar. 2012, *3GPP*, pp. 1-238.

Lim, J., et al. "Management of Neighbor Cell Lists and Physical Cell Identifiers in Self-Organizing Heterogeneous Networks", *Journal of Communications and Networks*, vo. 13, No. 4, Aug. 2011, pp. 367-376.

Wielgoszewska, A., et al., "A Centralized Method of PCI Assignment with Common Reference Signal Frequency Shift Control", *IEEE ICC*, May 22, 2016, pp. 1-6.

Extended European Search Report issued in the European Patent Office in counterpart European Application No. 17163368.8, dated Nov. 2, 2017, 8 pages.

\* cited by examiner

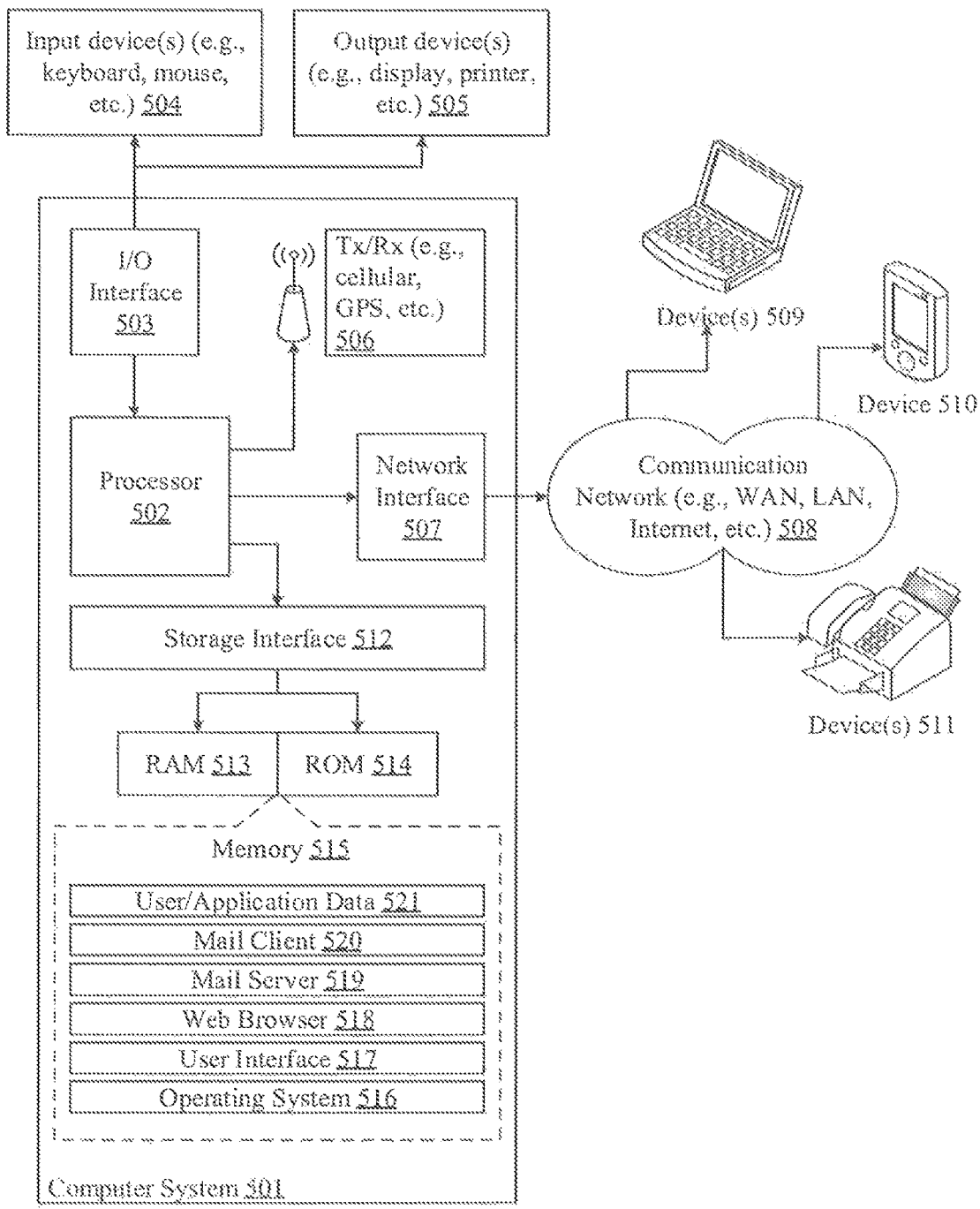
FIG. 5 Example Computer System

METHOD AND SYSTEM FOR RESOLUTION OF COLLISION OF PHYSICAL CELL IDENTIFIER (PCI)

TECHNICAL FIELD

The present subject matter is related, in general to wireless communications, and, particularly, but not exclusively to a method and a system for Physical Cell Identifier (PCI) collision detection and resolution.

BACKGROUND

In a Long Term Evolution (LTE) system, each base station may be assigned a Physical Cell Identifier (PCI) and number of PCI may be limited to five hundred and four unique values for a network operator. Hence, each of Serving Base Station (SBS) and Target Neighboring Base Station (TNBS) may be identified by the unique Physical Cell Identifier (PCI). In case of supporting larger number of (>504) Base Stations (BS), "reuse" of same PCI for a plurality of BSs have been in practice. During User Equipment (UE) start-up, the UE may use the received PCI values to synchronize (time) with the potential SBS. During start up, the received PCI values may be used by the UE for channel estimation (channel quality) with respect to each of the Neighboring Base Station (NBS). In a scenario, if the PCI values of SBS and at least one of the Neighboring Base Station (NBS) as received by an UE is same, then such a scenario may be detected as a PCI collision. PCI collision among BSs can lead to high level of signal interference (interference margin) for an UE thus leading to signal decoding error at the UE that is likely to impact channel estimation by the UE. This may result either in service quality impact due to incorrect data decoding and/or unnecessary initiation of handover.

Conventional PCI collision detection systems rely only on the signal strength received from different neighbor cells for PCI configuration and for PCI reuse. This does not however ensure that the interference is minimized. Further, the problem is aggravated when UEs are geographically located in different places unevenly in the coverage area of the SBS. PCI allocation based on the Primary Synchronization Signal (PSS) and Secondary Synchronization Signal (SSS) does not provide the guarantee that the interference between cells will be minimum. Traditionally, the PCI values are pre-configured during deployment of the new base station in the network. In the existing art, automatic neighbor relations (ANR) function are being executed by Serving Base Station (SBS), by analyzing received UE measurement reports, to detect PCI collision. In state of art mechanisms, the SBS may determine if the detected duplicate PCI values have same or different E-UTRAN Cell Global Identifier (ECGI). If ECGI values are different, then SBS may identify a PCI collision. However, PCI collision detection based on UE measurement report and associated ECGI values is likely to lead to collision detection even when the PCI values are same and the signal interference level is within limits (do not impact UE level Quality of Service). In such a scenario, such undesired collision detection may lead to unnecessary PCI reconfiguration. Moreover, state of art mechanisms requires the presence of X2 connection.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there may be provided a method for resolution of collision of Physical Cell Identifier (PCI) between a plurality of base stations. The method may include determining, by a PCI Collision Detection and Resolution Module (PCDRM), a value of a Physical Cell Identifier Collision Margin (PCICM). The method may further include detecting, by the PCDRM, a PCI collision among a plurality of base stations based on the determined PCICM value. In an embodiment, the plurality of base stations may include a Serving Base Station (SBS) and one or more Neighboring Base Stations (NBS). The method may further include estimating, by the PCDRM, a relative distance between the SBS and each of the one or more NBS. The method may further include reconfiguring, by the PCDRM, a new PCI value associated with the SBS based on the estimated relative distance.

According to embodiments illustrated herein, there may be provided a system for resolution of collision of Physical Cell Identifier (PCI) between a plurality of base stations. The system may include a processor and a memory communicatively coupled to the processor. The memory may store processor instructions, which, on execution, may cause the processor to determine a value of a Physical Cell Identifier Collision Margin (PCICM). The processor may be further configured to detect a PCI collision among a plurality of base stations based on the determined PCICM value. In an embodiment, the plurality of base stations may include a Serving Base Station (SBS) and one or more Neighbouring Base Stations (NBS). The processor may be further configured to estimate a relative distance between the SBS and each of the one or more NBS. The processor may be further configured to reconfigure a new PCI value associated with the SBS based on the estimated relative distance.

According to embodiments illustrated herein, a non-transitory computer-readable storage medium having stored thereon, a set of computer-executable instructions for causing a computer including one or more processors to perform steps of determining a value of a Physical Cell Identifier Collision Margin (PCICM). The one or more processors may be configured to detect a PCI collision among a plurality of base stations based on the determined PCICM value. In an embodiment, the plurality of base stations may include a Serving Base Station (SBS) and one or more Neighbouring Base Stations (NBS). The one or more processors may be configured to estimate a relative distance between the SBS and each of the one or more NBS. The one or more processors may be configured to reconfigure a new PCI value associated with the SBS based on the estimated relative distance.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 5 illustrates a block diagram of an exemplary computer system for implementing embodiments consistent with the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "In an embodiment," does not necessarily refer to the same embodiment.

Figure 1:
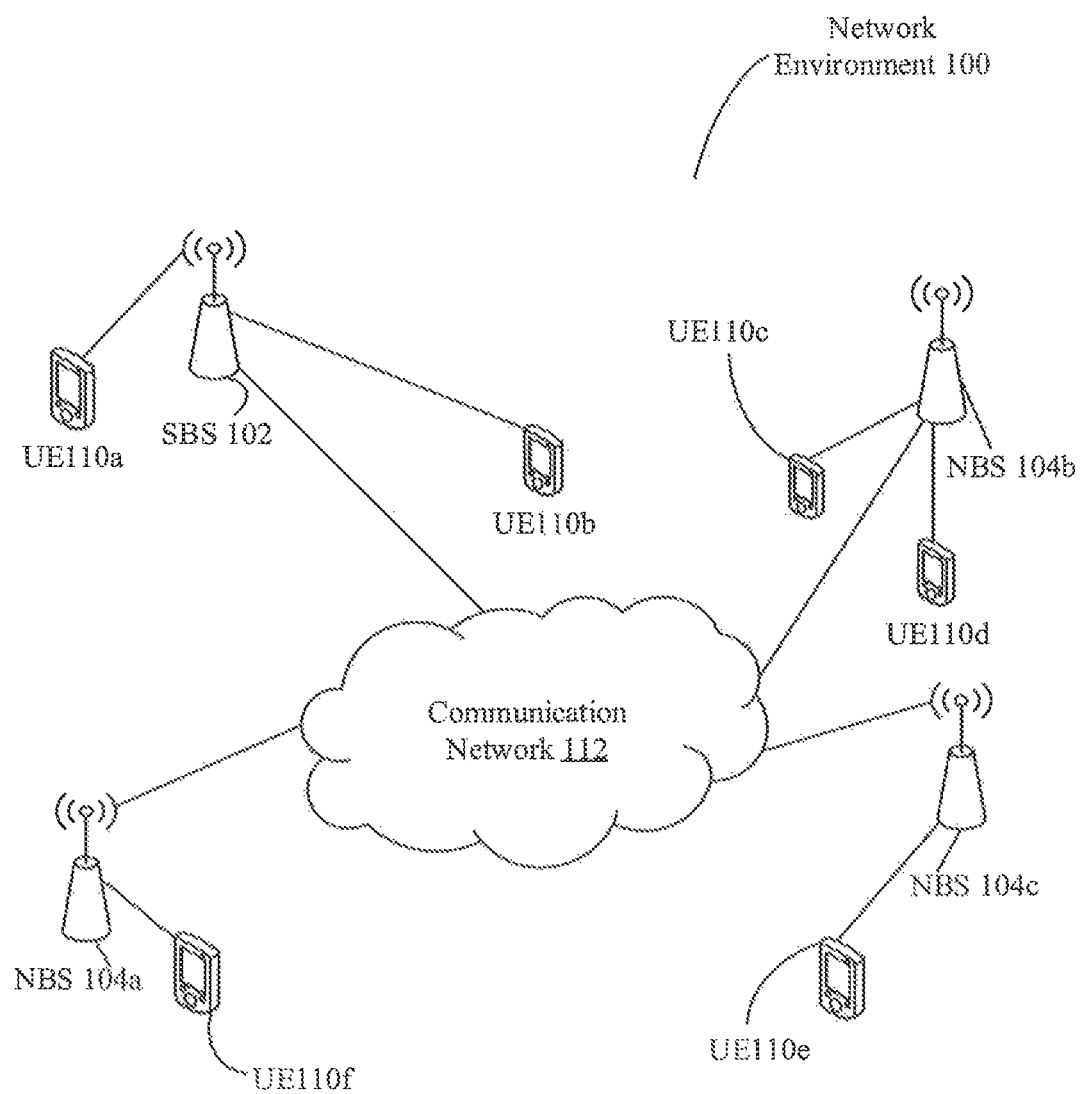
FIG. 1 illustrates an exemplary network environment in which various embodiments of the method and the system may be implemented.

FIG. 1 illustrates an exemplary network environment 100 in which various embodiments of the method and the system may be implemented. The network environment 100 may include a Service Base Station (SBS) 102, a Neighboring Base Station (NBS) 104a. NBS 104b, NBS 104c, collectively referred to as NBS 104, a User Equipment (UE) 110a, UE 110b, UE 110c, UE 110d e and UE 110f, collectively referred to as user equipment (UE) 110 and a communication network 112.

As shown in FIG. 1, the Base Stations (BS), also referred to as eNodeB, which may be SBS 102 or NBS 104 are communicatively coupled via a communication network 112 to a plurality of user equipment UE(s) 110. The term 'Base Station'('BS') or eNodeB (eNB) may refer to the any of SBS 102 or the NBS 104 and have been interchangeably used throughout the specification. In an embodiment, each of the SBS 102 may have an associated coverage area within which the UE 110 may be operable. In one example, the SBS 102 may serve one or more cells in which the UE 110 may operate. In case, a PCI collision is detected and all the five hundred and four PCIs are allocated to cells, the SBS 102 may reuse the PCIs for allocation. In an embodiment, the SBS 102 may determine a new PCI value for reuse from among the NBS 104 on detection of PCI collision. In an embodiment, the SBS 102 and the one or more NBS 104 may be referred to as an eNodeB configured to provide network coverage to the UEs 110. In an embodiment, the UEs 110 may be devices like mobile phones (handsets), WLL phones, or computers with wireless Internet connectivity. In an embodiment, the UE 110 may provide measurement of but not limited to parameters like Reference Signal Received Power (RSRP) and Reference Signal Received Quality (RSRQ) values to the SBS 102 and NBS 104.

In an embodiment, the communication network 112 may correspond to a communication medium through which the SBS 102, UEs 110, and the NBS 104, may communicate with each other. Such a communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR). IEEE 802.11, 802.16, 2G, 3G, 4G cellular communication protocols, and/or Bluetooth (BT) communication protocols. The communication network 112 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

Figure 2:
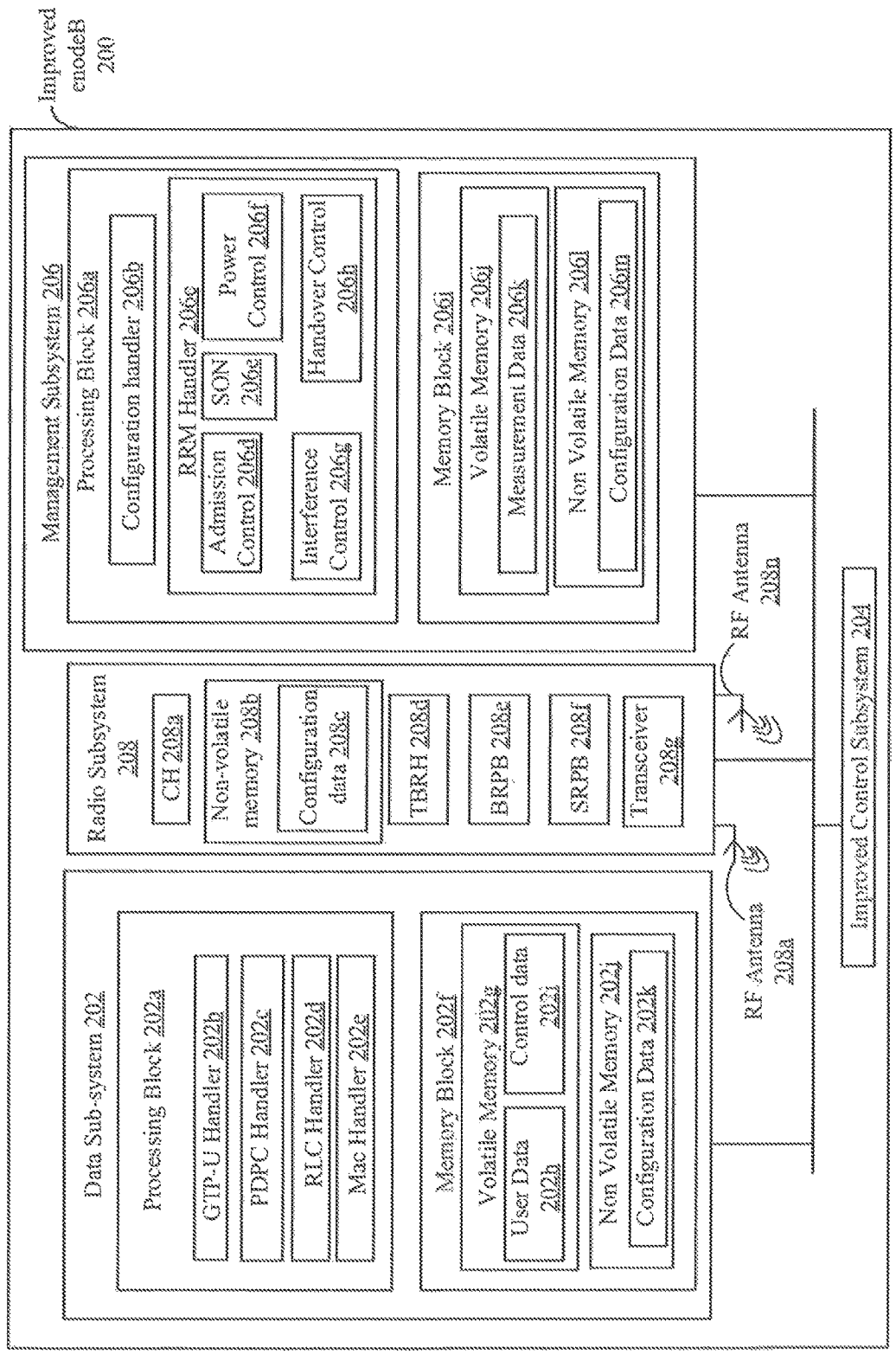
FIG. 2 is a block diagram that illustrates an improved eNodeB, in accordance with some embodiments of the present disclosure.

FIG. 2 is a block diagram that illustrates an improved eNodeB 200, in accordance with some embodiments of the present disclosure. In an embodiment, the improved eNodeB 200 may include a Data Subsystem (DSS) 202, an Improved Control Subsystem (ICS) 204, a Management Subsystem (MSS) 206, a Radio subsystem 208 and a plurality of RF Antenna 208a . . . 208 n, collectively referred to as 208. In an embodiment, the improved eNodeB 200 may correspond to the SBS 102.

In an embodiment, the Data Subsystem (DSS) 202 may carry user traffic, control messages for the UEs 110. In an embodiment, the DSS 202 may include a memory block which may further include a Volatile memory 202g and a Non-volatile memory 202j. In an embodiment, the volatile memory 202g in the DSS 202 may store the control data 202i and user data 202h. In an embodiment, data for controlling the radio access and connection between network and UE 110 may be referred to as 'control data'. In an embodiment, User data 202h may be specific to user's application data such as voice. In an embodiment, the Non-volatile memory 202j in DSS 202 may store a configuration data 202k. In an embodiment, data from the Improved Control Subsystem (ICSS) 204, for configuring DSS 202 to make it operational may be termed as 'Configuration Data' 202*k*.

In an embodiment, the Data Subsystem (DSS) 202 may include an S1-UInterface, a DP-CPInterface, a PHYInterface, Volatile Memory Path, Non-volatile Memory Path, and a Processing Block 202*a*. In an embodiment, eNodeB 200 may receive user traffic to/from Serving Gateway (SGW) through S1-U interface. In an embodiment, eNodeB 200 may use a DP-CP interface for exchange of control data 202*i* and configuration data 202*k* between DSS 202 and ICSS 204. In an embodiment, exchange of data between Radio subsystem 208 and DSS 202 are through PHY interface. The PHY interface may consist of transport channels in eNodeB 200. In an embodiment, the Volatile memory path may be used by the Processing Block 202*a* to store or retrieve the control/user data (202*h* or 202*i*) from Volatile Memory 202*g*. In an embodiment, Processing Block 202*a* may use the non-volatile memory path to store and retrieve configuration data 202*k* from the Non-volatile memory 202*j*.

It may be appreciated by those skilled in the art that the Control messages/data and Configuration messages/data in the various units across the specification though have been numbered differently in different units for ease of explanation, they may refer to the same Control messages/data and Configuration messages/data that are being transferred amongst various units.

In an embodiment, the Processing Block 202*a* in the DSS 202 may include a GTP-U Handler 202*b*, a PDCP Handler 202*c*, an RLC Handler 202*d* and a MAC Handler 202*e*. In an embodiment, the MAC handler 202*e* may receive Configuration Data 202*k* from ICSS 204 by the DP-CP interface and configure itself. In an embodiment, the MAC handler 202*e* may receive the Configuration Data 202*k* in Downlink (DL) from the RLC handler 202*d*. In an embodiment, Radio Subsystem (RSS) 20 may provide the data to MAC handler 202*e* in (Uplink) UL through PHY interface. In an embodiment, the MAC handler 202*e* may further process the received data, as per 3GPP TS 36.321. In an embodiment, the MAC handler 202*e* may be responsible for error correction through Hybrid Automatic Repeat Request (HARQ), priority handling between UEs by means of dynamic scheduling, priority handling between logical channels of one UE called logical channel prioritization. In an embodiment, the MAC handler 202*e* may also responsible for multiplexing of packets received from RLC handler 202*d* onto transport blocks (TB) to be delivered to the RSS 208 on transport channels, de multiplexing of received transport blocks (TB) delivered from the RSS 208 on transport channels. In an embodiment, the MAC handler 202*e* may after processing, pass the data to RSS 208 in DL and to RLC handler in UL.

In an embodiment, the RLC handler 202*d* may be configured based on the Configuration Data 202*k* received through the DP-CP interface. The RLC handler 202*d* may receive control data 202*i* and user data 202*h* from MAC handler in UL and from PDCP handler in DL. In an embodiment, RLC handler 202*d* may further process the received data as per 3GPP TS 36.322. In an embodiment, RLC handler 202*d* may be responsible for the segmentation and concatenation of received packets in DL. In an embodiment RLC handler 202*d* may be responsible for the reassembly of received packets in UL. In an embodiment. RLC handler 202*d* may also be configured to detect duplicate packets received in UL and discard the detected duplicate packets. In an embodiment, RLC handler 202*d*, may send the data to PDCP handler 202*c* in UL and MAC handler in DL after processing.

In an embodiment, the PDCP Handler 202*c* may be configured based on the configuration data 202*k* received by the DP-CP interface. The PDCP handler may receive the control data 202*i* from CSS in DL and from RLC handler in UL. User data 202*h* may be received by PDCP handler 202*c* from GTPU handler in DL and from RLC handler in UL. In an embodiment, the PDCP handler 202*c* may process the user data 202*h* further as given in 3GPP TS 36.323. In an embodiment, the PDCP handler 202*c* may be responsible for header compression of user data 202*h* in downlink and decompression in uplink. In an embodiment, the PDCP handler 202*c* may have ciphering and deciphering of user traffic and control data and integrity protection in downlink and integrity verification in uplink of control data 202*i*. To maintain delay sensitivity of user traffic, PDCP handler 202*c* also does timer based discard. After processing, may send the Control Data 202*i* to ICSS 204 and user data 202*h* to GTPU handler in UL and in DL both Control Data 202*i* and User Data 202*h* are given to RLC handler 202*d*.

In an embodiment, the configuration of GTP-U handler 202*b* may be configured through the configuration data 202*k* received through DP-CP interface. In an embodiment, the GTP-U handler 202*b* may receive user data from SGW through S1-U interface in DL and from PDCP handler in UL. In an embodiment, the GTP-U handler 202*b* may further process the received user data 202*h* as per the procedures given in 3GPP TS 29.281. In an embodiment, the GTP-U handler 202*b* may provide a tunnel of user traffic between the eNB 200 and Serving Gateway (SGW). In an embodiment, the GTP-U handler 202*b* may after processing send the packets to SGW in UL and to PDCP handler 202*c* in DL.

In an embodiment, the Management Subsystem (MSS) 206 may include a MSS-CSS Interface, an O&M Interface, a Memory Block 206*i*, a Volatile Memory Path, a Non-volatile Memory Path and a Processing Block 206*a*. In an embodiment, the MSS-CSS Interface may be used between MSS 206 and ICSS 204 module for sending control instruction and configuration parameters to ICSS 204 and receiving the system level measurement data from ICSS 204. In an embodiment, the Operation and Maintenance Interface (O&M) may be used between Operation and Maintenance (O&M) entity and MSS 206 module for receiving and configuration parameters to O&M. In an embodiment, the O&M Interface may be used by the MSS 206 to indicate O&M about system level feedback.

In an embodiment, Memory bus based volatile memory path may be used by the Processing Block 206*a* to store or retrieve the control from the Volatile memory 202*g*. In an embodiment, Processing block 206*a* may use the non-volatile memory path to store and retrieve configuration data 206*m* from non-volatile memory 206*l*. In an embodiment, the Processing Block 206*a* may be a single processor with the multiple partitions or independent processors working in a group. In an embodiment, the processing block may include a Configuration Handler 206*b* and an RRM Handler 206*c*.

In an embodiment, the Configuration Handler 206*b* may handle the overall configuration of the eNB 200 or the SBS 102. In an embodiment, the Configuration Handler 206*b* may receive the configuration data 206*m* from O&M and store them at Non-volatile memory 206*l* at start up. In an embodiment, the Configuration Handler 206*b* may initialize the ICSS 204, DSS 202 and RSS 208. In an embodiment, the Configuration Handler 206*b* may configure ICSS 204, DSS 202 and RSS 208 with the configuration data 206*m* stored at the Non-volatile Memory 206*l*. In an embodiment, the Configuration Handler 206*b* may receive reconfiguration data from the O&M. In an embodiment, the Configuration Handler 206b may reconfigure ICSS 204, DSS 202 and RSS 208. In an embodiment, the Configuration Handler 206b may update feedback to O&M to help O&M change the configuration data 206m.

In an embodiment, the RRM Handler 206c may take management decision to efficiently run the eNB 200. In an embodiment, the RRM handler 206 may include a Self-Organized Network (SON) 206e. In an embodiment, the Self-Organized Network (SON) 206e may be configured to (re)organize the eNB 200 in a dynamically changing network topology based on configuration data 206m and measurement data 206k stored in MSS 206. In an embodiment, the Self Organized Network (SON) 206e may perform Physical Cell Identity (PCI) Self Configuration and Self Optimization. In an embodiment, the Self Organized Network (SON) 206e may be configured to perform Automatic Neighbor Relation (ANR) management and X2 Link Auto creation. In an embodiment, the Self Organized Network (SON) 206e may be configured to perform Cell Outage Detection. In an embodiment, the Self Organized Network (SON) 206e may be configured to perform Cell Coverage Optimization. In an embodiment, the Self Organized Network (SON) 206e may be configured to collect live measurement metrics to send the O&M feedback about current condition of the network.

In an embodiment, the Management Subsystem (MSS) 206 may include a Memory Block 206i which may include a Volatile Memory 206j and a Non-volatile memory 206l. In an embodiment, the Volatile memory 206j in MSS 206 may store the system level Measurement Data 206k provided by the ICSS 204. In an embodiment, the RRM handler 206c may take decision based upon the Measurement data 206k. The Measurement data 206k may represent different measurement metrics collected from the UE 110 and calculated by ICSS 204, DSS 202 and RSS 208. These data are used to monitor the prevalent radio network condition to take radio network management decisions.

In an embodiment, the Non-volatile memory 206l in MSS 206 may store the Configuration Data 206m received from an Operations Administration and Management System (OAM). The Processing Block 206a may access the data from this Memory 206i and configure ICSS 204, DSS 202 and RSS 208 through MSS-CSS Interface. In an embodiment, the Configuration Data 206m may represent the configuration information sent from O&M system to eNB 200, required for configuration, updating of existing configuration or instantiation of improved eNB 200.

In an embodiment, the Management Subsystem (MSS) 206 may be configured for the system level management of co-channel interference, radio resources, and other radio transmission characteristics in improved eNB 200. In an embodiment, the Radio subsystem 208 interfaces with DSS 202 and ICS 204 and offers data transport services to higher layers. In an embodiment, the Radio subsystem 208 may include a PHY (not shown). In an embodiment, the Radio subsystem 208 may handle channel coding, PHY hybrid automatic repeat request (HARQ) processing, modulation, multi-antenna processing, and mapping of the signal to the appropriate physical time-frequency resources by the PHY means.

In an embodiment, the Radio subsystem 208 may include a Configuration Handler (CH) 208a, a Non-volatile memory 208b, Transport Block Receiver/Handler (TBRH) 208d, Bit Rate Processor Block (BRPB) 208e, Symbol Rate Processor Block (SRPB) 208f and a Transceiver 208g. In an embodiment, the Radio subsystem 208 may include a TB Path (not shown) which may connect a TBRH 208d to a BRPB 208e. The TB Path may carry the transport block over the message queue interface. The TB path may be an uni-directional link. In an embodiment, the Radio subsystem 208 may include a CB Path.

The CB path may connect the BRPB 208e with SRPB 208f. The CB path may carry the code words over the message queue. The CB path may be an uni-directional link. In an embodiment, the Radio subsystem 208 may include a Modulation Symbols Path. In an embodiment, the Modulation Symbols Path may connect the SRPB 208f with the Transceiver. In an embodiment, the Modulation Symbols Path may carry the modulation symbols over a high speed path. The Modulation Symbols Path may be an uni-directional link.

In an embodiment, the Radio subsystem 208 may include a CH-Non-Volatile memory path which may be an uni-directional path. In an embodiment, a Configuration handler 206b may write the Configuration parameters (data) 208c to a non-volatile memory 206l by the CH-Non-Volatile memory path. In an embodiment, the Radio subsystem 208 may include a BRPB-Non-Volatile memory path. In an embodiment, the BRPB-Non-Volatile memory path is used to connect a Bit Rate Processing Block 208e with the non-volatile memory to where the Configuration data 206m may be stored. In an embodiment, the Radio subsystem 208 may include a SRPB-Non-Volatile memory path. In an embodiment, the SRPB-Non-Volatile memory path may be used to connect a Symbol Rate Processing Block (SRPB) 208f with the non-volatile memory where the Configuration data 208c is stored.

In an embodiment, the LTE downlink radio subsystem processing may receive user data and control streams from the DSS 202 in the form of transport blocks (TB) in a communication message over the transport/control path. In an embodiment, Transport Block Receiver/Handler (TBRH) 208d may classify the data as critical and non-critical data and forwards it to Bit Rate Processor 208e over the TB path.

In an embodiment, the Configuration Handler (CH) 208a may receive configuration messages 208c from the Management subsystem 206 in a communication message over a configuration path. In an embodiment, the Configuration Handler (CH) 208a may further classify and store the configuration information in the non-volatile memory. In an embodiment, the configuration data 208c may be stored in the Non-volatile memory 208b in the form of structures which is accessible to the RF subsystem modules.

In an embodiment, the TBs are received at the Bit Rate Processor Block (BRPB) 208e, from the TB handler in a communication message. In an embodiment, Bit Rate Processor Block 208e may include a Bit Rate Processor (not shown). In an embodiment, Bit Rate Processor may work with instructions given in 3GPP TS 36.212 standard. In an embodiment, the Bit Rate Processor may begin processing of TB by calculating the cyclic redundancy check (CRC) and attaching it to the transport block. As may be apparent to persons skilled in the art that if the transport block size is larger than the maximum allowable code block size of 6,144 bits, code block segmentation is performed. A new CRC may be calculated and attached to each code block before channel encoding. Turbo encoding provides a high-performance forward-error-correction scheme for reliable transmission. Rate matching performs puncturing or repetition to match the rate of the available physical channel resource and HARQ provides a robust retransmission scheme when the user fails to receive the correct data. Bit scrambling may be performed after code-block concatenation to reduce the length of strings of 0s or 1s in a transmitted signal to avoid synchronization issues at the receiver before modulation. The code blocks may be then forwarded to symbol rate processor over the CB path.

In an embodiment, the Symbol Rate Processor Block (SRPB) 208f may receive CB in a communication message from Bit Rate Processor over the CB path. In an embodiment, the Symbol Rate Processor may work with instructions given in 3GPP TS 36.212 standard. In an embodiment, the Symbol Rate Processor Block 208f may process the code blocks by converting them to modulation symbols. Various modulation schemes (quadrature phase shift keying [QPSK], 16 QAM [quadrative amplitude modulation], or 64 QAM) may be used. In an embodiment, the symbols may be mapped to layers and precoding supporting multi-antenna transmission. In an embodiment, these modulation symbols may be forwarded to transceiver for transmission. In an embodiment, the received modulation symbols over the modulation symbols path may be mapped to resource elements. In an embodiment, the resource elements of orthogonal frequency-division multiplexing (OFDM) symbols may be mapped to each antenna port and sent for air transmission via the transmitter. In an embodiment, the bit rate processor may work with instructions given in 3GPP TS 36.212 standard.

The Radio Frequency (RF) antennas 208a to 208n may be collectively referred to as 208 in FIG. 2. In an embodiment, the Radio Frequency (RF) antennas 208 may be connected to the Radio sub system 208. The RF antennas 208 may be standard RF antennas used in the field of art.

Figure 3:
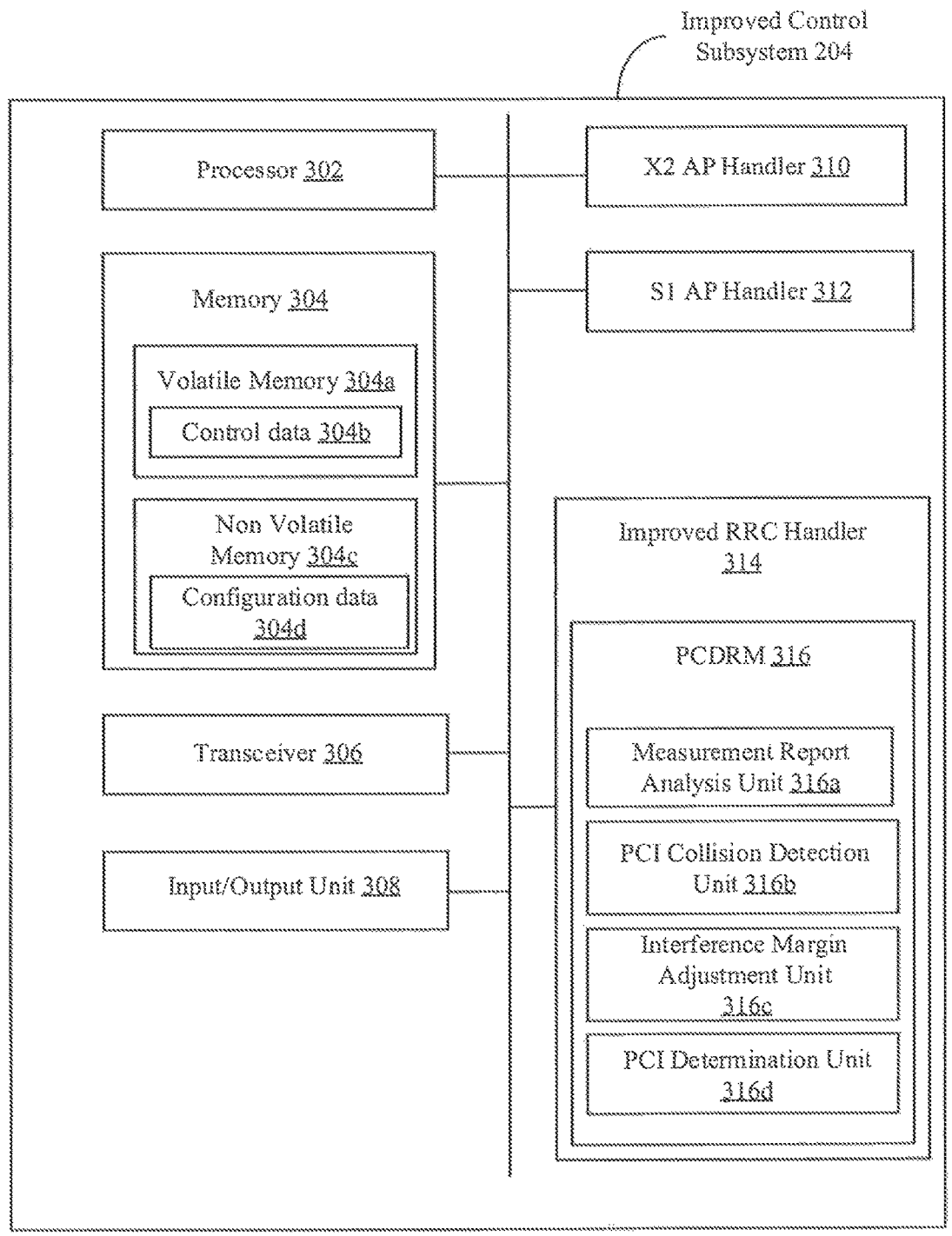
FIG. 3 is a block diagram that illustrates an improved Control Subsystem, in accordance with some embodiments of the present disclosure.

FIG. 3 is a block diagram that illustrates an improved control subsystem (ICSS) 204 in accordance with some embodiments of the present disclosure. The improved control subsystem (ICSS) 204, in accordance to some of the embodiments of the present invention, may include, a processor 302, a memory 304, a transceiver 306, an Input/Output unit 308, a X2 AP Handler 310, a S1 AP Handler 312, and an Improved Radio Resource Control (IRRC) Handler 314. The improved control subsystem 204 may further include an S1 MME interface (not shown), a CP-DP Interface (not shown), an X2 Interface (not shown), CSS-MSS Interface (not shown), PHY Interface (not shown), a volatile Memory Path (not shown), and a non-volatile Memory Path (not shown). The processor 302 may be configured to communicate with the memory 304, a transceiver 306, an Input/Output unit 308, a X2 AP Handler 310, a S1 AP Handler 312, and an improved RRC Handler 314 using at least one of the S1 MME interface (not shown), the CP-DP Interface (not shown), the X2 Interface (not shown), the CSS-MSS Interface (not shown), the PHY Interface (not shown), the volatile Memory Path (not shown), and the non-volatile Memory Path (not shown).

The processor 302 may include suitable logic, circuitry, interfaces, and/or code that may be configured to execute a set of instructions stored in the memory 304. The processor 302 may be implemented based on a number of processor technologies known in the art. Examples of the processor 302 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 304 may include suitable logic, circuitry, interfaces, and/or code that may be configured to store the set of instructions, which may be executed by the processor 302. In an embodiment, the memory 304 may be configured to store one or more programs, routines, or scripts that may be executed in coordination with the processor 302. The memory 304 may be implemented based on a Random Access Memory (RAM), a Read-Only Memory (ROM), a Hard Disk Drive (HDD), a storage server, and/or a Secure Digital (SD) card.

The memory 304 may further include a volatile memory 304a and a non-volatile memory 304c. The Volatile Memory 304a may store control data 304b for the ICSS 204. In an embodiment, the control data 304b may be the data for controlling the radio access and connection between the communication network 112 and UE 110. In an embodiment, the processor 302 may use the Volatile Memory Path to store or retrieve the control from the volatile memory 304a. In an example the Volatile Memory Path may be a memory bus. The Non-Volatile Memory 304b in ICSS 204 may store the Configuration Data 304d received from the OAM in MSS 206. Configuration Data 304d may include the data from MSS 206 which may be used to configure ICSS 204. In an embodiment, the processor 302 may use the Non-Volatile Memory Path to store and retrieve the Configuration Data 304d from the Non-Volatile Memory 304c. In an example the Non Volatile Memory Path may be the memory bus.

The Control Data 304b may represent the control packets received from or sent to packet core and eNB 200 system to or from user (UE 110) responsible for radio connection establishment, mobility handling and session establishment & termination. The Configuration Data 304d may represent the configuration information from Operations Administration and Management (OAM) system towards eNB 200 required for configuration, updating existing configuration, instantiation of eNBs 200.

The transceiver 306 may include suitable logic, circuitry, interfaces, and/or code that may be configured to retrieve a set of operations associated with the improved RRC Handler 314. The transceiver 306 may be further configured to transmit information pertaining to the determined PCI. The transceiver 306 may implement one or more known technologies to support wired or wireless communication with the communication network. In an embodiment, the transceiver 306 may include, but is not limited to, an antenna, a radio frequency (RF) transceiver, one or more amplifiers, a tuner, one or more oscillators, a digital signal processor, a Universal Serial Bus (USB) device, a coder-decoder (CO-DEC) chipset, a subscriber identity module (SIM) card, and/or a local buffer. The transceiver 306 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The Input/Output (I/O) unit 308 may include suitable logic, circuitry, interfaces, and/or code that may be configured to receive an input or transmit an output. The input/output unit 308 may include various input and output devices that are configured to communicate with the processor 302. Examples of the input devices include, but are not limited to, a keyboard, a mouse, a joystick, a touch screen, a microphone, and/or a docking station. Examples of the output devices include, but are not limited to, a display screen and/or a speaker.

The X2 AP Handler 310 may include suitable logic, circuitry, interfaces, and/or code that may be configured to receive Configuration Data 304*d* and process the Configuration Data 304*d*. In an embodiment, X2AP Handler 310 may receive Configuration Data 304*d* from management sub-system through CSS-MSS interface. In an embodiment, X2AP Handler 310 may receive Control data 304 from the improved RRC handler 314 in UL and DL. In an embodiment, X2AP Handler 310 may also receive Control data 304 through X2 interface from neighbor eNB for example NBS 104 as shown in FIG. 1. In an embodiment, X2AP Handler 310 may process the received the Configuration Data 304*d* and Control Data 304 as per specification 3GPP TS 36.423. In an embodiment, X2AP Handler 310 on receiving the Configuration Data 304*d* and Control data 304 may perform the function of handover processing.

In an embodiment, X2AP Handler 310 on receiving the Configuration Data 304*d* and Control data 304*b* may perform the function of BS Load processing. In an embodiment, X2AP Handler 310 on receiving the Configuration Data 304*d* and Control data 304*b* may perform the function of X2 interface establishment. In an embodiment, X2AP Handler 310 on receiving the Configuration Data 304*d* and Control Data 304 may perform the function of SBS 102 configuration. In an embodiment, X2AP Handler 310 may receive Control data 304 from IRRC handler 314 in UL and DL. In an embodiment, X2AP Handler 310 may also receive Control data 304 through X2 interface from neighbor eNB for example NBS 104 as shown in FIG. 1. In an embodiment, X2AP Handler 310 may process the received the Configuration Data 304*d* and Control Data 304 as per specification 3GPP TS 36.423.

The S1 AP Handler 312 may include suitable logic, circuitry, interfaces, and/or code that may be configured to receive the Configuration Data 304*d* from the Management Sub-system 206 through CSS-MSS interface. In an embodiment, the S1AP 312 may process the Configuration Data 304*d* and store it in Non-Volatile memory 304*c*. In an embodiment, the S1AP 312 may be configured to receive the Control Data 304*b* through S1-MME interface in DL and from RRC handler in UL. On receiving the Configuration Data 304*d* and the Control Data 304*b*, the S1AP 312 processes Configuration Data 304*d* and the Control data 304 as per specification 3GPP TS 36.413. In an embodiment, the S1AP 312 may on receiving the Configuration Data 304*d* and the Control data 304 may be configured to perform E-RAB configuration, allocation to/release from user-service-context, etc. In an embodiment, the S1AP handler 312 may on receiving, the Configuration Data 304*d* and Control data 304, may be configured to provide UE Capability Information. In an embodiment, the S1AP 312 may after processing the Configuration Data 304*d* and the Control data 304 and after performing the desired execution, may encode the packets and send it to IRRC 314 handler in DL and to packet core through S1-MME interface in UL. In an embodiment, the S1AP 312 may on receiving the Configuration Data 304*d* and the Control data 304 may be configured to perform Mobility Functions. In an embodiment, the S1AP 312 may on receiving the Configuration Data 304*d* may be configured to perform S1 interface establishment and release. In an embodiment, the S1AP 312 may on receiving the Configuration Data 304*d* and the Control data 304 may be configured to perform NAS Signaling transport function.

In an embodiment, the S1AP 312 may on receiving the Configuration Data 304*d* and the Control data 304 may be configured to perform S1 UE context management.

The improved RRC handler 314 may include suitable logic, circuitry, interfaces, and/or code that may be configured to detect PCI collision and provide a method for resolution of the detected PCI collision. In an embodiment, the improved RRC handler (IRRC) 314 may include a PCI Collision Detection and Resolution Module (PCDRM) 316 embedded in it to achieve the improvement in accordance to the present invention. In an embodiment, the PCDRM 316 may include suitable logic, circuitry, interfaces, and/or code that may be configured to provide a resolution of collision of Physical Cell Identifier (PCI) between a plurality of base stations. In an embodiment, the improved RRC Handler 314 may further include a connection component. The connection component may handle the connection establishment with the access network and core network. In an embodiment, the improved RRC Handler 314 in accordance to the present invention may include a configuration component (not shown). The Configuration component may receive different configurations which may include but not limited to Radio Configuration for Automatic Repeat Request (ARQ), Measurement Configuration from MSS 206 (Management Subsystem). The configuration component may handle the configuration parameters for PCDRM 316 configuration.

In an embodiment, the Improved RRC handler (IRRC) 314, may be configured to receive the Configuration Data 304*d* from the MSS 206 by the CSS-MSS interface. In an embodiment, the configuration of the IRRC handler 314 may be performed based on the received Configuration Data 304*d*. In an embodiment, the IRRC handler 314 may send different configuration data 304*d* to UE 110 through the PHY interface in downlink (DL). In an embodiment, the IRRC handler 314 may send different configuration data 304*d* to core network in uplink (UL). In an embodiment, the IRRC 314 may be configured to receive UL control data 304*b* from the RLC handler 202*d* and PDCP handler 202*c* of the DSS 202 and DL packets from S1AP handler 312. In an example, the IRRC handler 314 on receiving the control data 304*b* may perform the function of System Information broadcast for NAS and AS. In an example, the IRRC 314 on receiving the control data 304*b* may provide the service for paging. In an example, the IRRC 314 on receiving the control data 304*b* may be configured to establish, maintain and release an RRC connection between the UE 110 and eNodeB, such as SBS 102. In an example, the IRRC 314 on receiving the control data 304*b* may be configured to establish, maintain and release of point to point Radio Bearers. In an example, the IRRC handler 314 on receiving the control data 304*b* may be configured to perform Security handling, Quality of Service (QoS) management functions. In an embodiment, the IRRC 314 on receiving the control data 304*b* may perform the function of Non-access stratum (NAS) message transfer between UE 110 and core network. In an embodiment, the IRRC handler 314 on receiving the control data 304*b* may perform the function of UE measurement configuration and report handling.

In an embodiment, the IRRC handler 314 may include an Admission Control. The IRRC handler 314 may analyze the current network load and the user capability to allow the user connectivity into the network. In an embodiment, the IRRC handler 314 may include a Power Control module (not shown). In an embodiment, Power Control module may analyze different network condition to decide on the transmission power that maybe be used by the improved eNB 200. In an embodiment, the IRRC handler 314 may include a Handover Control module (not shown). In an embodiment, the Handover Control module may analyze the measurement data for different NBS 104 to decide on the target eNB for the handover purpose. The IRRC handler 314 may include an Interference Control Module (not shown). In an embodiment, the Interference Control Module may analyze the measurement data for different NBS 104 and reconfigure the eNB (SBS 102) to reduce interference from other eNBs or NBS 104.

In an embodiment, the PCDRM 316 may include a Measurement Report Analysis Unit 316a, a PCI Collision Detection Unit 316b, an Interference Margin Adjustment Unit 316c, and a PCI Determination Unit 316d. In an embodiment, the Measurement Report Analysis Unit 316a may be configured for analyzing measurement report received from UE 110 in the coverage area of the network. For example, the Measurement Report Analysis Unit (MRA) 316a at the SBS 102 may analyze the measurements of Reference Signal Received Power (RSRP) and Reference Signal Received Quality (RSRQ) values measured by the UE 110a and the UE 110b. In an embodiment, the MRA 316a may store the different parameters of measurement (for example RSRP values, RSRQ values) for PCI collision detection.

The PCI Collision Detection unit (PCD) 316b may be configured for detecting PCI collision with an NBS 104. In an embodiment, the PCD 316b may be configured to receive the stored parameters of measurement from MRA 316a and may detect if the PCI of the SBS 102 collides with the PCI of the NBS 104.

The Interference Margin Adjustment Unit (IMA) 316c may be configured for adjusting interference margin. In an embodiment, the IMA 316c may adjust the interference margin based on the deviation from pre-configured values of the interference margin for determining the interference margin. In an embodiment, the adjustment of the interference margin may be an iterative process. In an embodiment, the adjustment of the interference margin may be made with the calculated values of interference margin based on comparison of the calculated interference margin values with a certain threshold.

The PCI Determination Unit (PD) 316d may be configured for determining a PCI for re-use in the SBS 102. In an embodiment, the PCI may be configured to determine a PCI having the least impact on the interference for the UEs 110 of the network from among a plurality of PCIs. In an embodiment, the PD 316d may be further configured to calculate the maximum power transmit ($TXPowMax_{Final}$) for a new eNB (for example NBS 104a) for the selected PCI. In an embodiment, the PD 316d may be configured to transmit the determined PCI to MSS 206.

The IRRC handler 314, after processing the received packets and performing the desired execution, may encode the packets and send it to UE handler in DL and to X2AP 310/S1AP 312 handler through S1-MME interface in Uplink (UL) and through X2 interface to neighbor eNB 200.

The PCDRM 316 may include but not limited to different types of connections like C1, C2, C3, C4, C5, C6. The C1 connection may be used for communication between Initialization and Measurement report analysis component (MRA) 316a. The MRA 316a receives measurement and PCDRM 316 configuration information through this connection. The C2 connection may be used for communication between MRA 316a and PCI Determination Unit (PD) 316d may receive the analyzed measurement report and stored parameters through this connection for further processing. The C3 connection may be used for communication between PCD 316b and Interference Margin Adjustment Unit (IMA) 316c. The IMA 316c may adjust the threshold parameter for interference based on the determined parameters received from PCI Collision Detection Unit (PCD) 316b. The C4 connection may be used for communication between IMA 316c and PCI Determination Unit (PD) 316d. PCI determination for re-use is decided based on the threshold interference margin received from IMA 316c. In an embodiment, the C5 connection may be used for communication between PCI Determination Unit (PD) 316d and Transmission Power Determination Unit (TPD) (not shown). In an embodiment, the TPD may be a part of the PCI Determination Unit 316d. In an embodiment, the TPD may determine the minimum impact on interference due to PCI-reuse by determining the signal path loss from the base station to UE. In an embodiment, the C6 connection may be used for communication between PCI Determination Unit 316d and Transmission Power Determination (TPD) Unit in case the where TPD is separate from the PCI Determination Unit 316d.

The PCDRM 316 may include but not limited to different types of interfaces like X2 interface, S-MME interface, CP-DP interface, CSS-MSS Path, Volatile memory path and Non-volatile memory path. In an embodiment, the eNB 200 may use the CSS-MSS Path to receive and send configuration parameters from OAM. PCDRM 316 may use CSS-MSS Path for interfacing with the Management Application through (PCDRM-MA). In an embodiment, the eNB 200 may use the X2 Interface to exchange Control data 304b between two eNBs (SBS and NBS). In an embodiment, the eNB may use S1-MME to send and receive Control data 304b to/from MME through S1-U interface. In an embodiment, the eNB 200 may use the CP-DP interface to send and receive Configuration Data 304d and Control data 304 to DSS module 202. The Volatile memory path may be a memory path, used by the processor 302 to store or retrieve the Control data 304 from the volatile memory. The Non-volatile memory path may be a memory path used by the processor 302 to store and retrieve Configuration data 304d from Non-volatile memory 304c.

The Local-Configuration (LC) may include but not limited to the following parameters such as Adjustment Timer (Timeradjustment), Threshold Number of UE (UEth), Threshold RSRP (RSRPth), Threshold RSRQ (RSRQth), Interference Margin (INTRFmargin), Threshold Received Power for Path Loss (µTH_CELL) and Power Hysteresis between re-used PCI (µTH_CELL). In an embodiment, the Adjustment Timer (Timeradjustment) is used to determine the duration for adjustment of the interference margin. After elapse of the timer the PCDRM 316 checks if the interference margin need to change based on the deviation from the threshold interference level. In an embodiment, the Threshold Number of UE (UEth) may be used to determine the PCI collision impact. The threshold values (UEth) may be dynamically changed based on the number of UEs in the coverage area for reporting PCI collision in measurement report. In an embodiment, the Threshold RSRP (RSRPth) may be used to determine PCI collision. If RSRP in the measurement report is below threshold level, then PCDRM 316 shall not consider the PCI collision. In an embodiment, the Threshold RSRQ (RSRQth) is used to determine PCI collision. If RSRQ in the measurement report is below threshold level, then PCDRM 316 shall not consider the PCI collision. In an embodiment, the Interference Margin (INTRFmargin) may be used to determine the PCI collision. In an embodiment, the Threshold Received Power for Path Loss (µTH_CELL) may be used to the determine the distance between the farthest NBS and the SBS with the same PCI. In an embodiment, the Power Hysterisis between re-used PCI (ΔTH_CELL) may be used to determine the maximum transmit power for the selected PCI for reconfiguration.

In operation, for initial configuration the PCDRM 316 may obtain configuration parameters from management application (MA) of the Management Subsystem 206, through an MA-PCDRM interface (not shown). In an embodiment, the PCDRM 316 may keep the configuration related parameters in Local Configuration Unit (LC) of memory PCRDM-PM (not shown). In an embodiment, the configuration parameter may include but not limited to Adjustment Timer ($Timer_{adjustment}$), Threshold Number of UE ($UE_{th}$), Threshold RSRP ($RSRP_{th}$). Threshold RSRQ ($RSRQ_{th}$), Interference Margin ($INTRF_{margin}$). In an embodiment, the PCDRM 316 may obtain the pre-configured values of $PCDRM_{Config}$ from the Management Subsystem 206 through MA-PCDRM interface. In an embodiment, the PCDRM 316 may check if it is in the first-time-start-up mode and performs startup initialization.

During initialization, the PCDRM 316 may store the received configuration parameters in in Local Configuration Unit (in memory) of the PCDRM 316. In an embodiment, the PCDRM 316 may check if it is in the first-time-start-up mode and perform reconfiguration of the SBS 102. In an embodiment, the PCDRM 316 may check if there is any change in $PCDRM_{Config}$ parameter values by comparing the existing values of $PCDRM_{Config}$ parameters against the obtained PCDRM Config parameter values from the Management Subsystem 206. In an embodiment, the PCDRM 316 may detect a change in $PCDRM_{Config}$ values. In an embodiment, the PCDRM 316 may replace the local copy of $PCDRM_{Config}$ ($PCDRM_{Config}$-LC) parameter values in its memory, in case of the detected change in $PCDRM_{Config}$ values. In an embodiment, the PCDRM 316 may load the current configuration, in case no change is detected in the in $PCDRM_{Config}$ values. In an embodiment, the PCDRM 316 may, load $PCDRM_{Config}$-LC values from its persistent storage to own memory when not in start-up mode or in re-configuration mode. In an embodiment, the PCDRM 316 after initialization may send configured parameters to Measurement Report Analysis unit (MRA) 316a through C1 connection.

In an embodiment, the Measurement Report Analysis unit (MRA) 316a may be configured to receive the RSRP value(s) and the RSRQ value(s) from the one or more UE(s). In an embodiment, the PCDRM 316 may extract measurement report for each UE 110 in the coverage area of SBS. After receiving the RSRP value(s) and the RSRQ value(s), the Measurement Report Analysis unit 316a may be configured to determine a value of a Physical Cell Identifier Collision Margin (PCICM) based on a distribution of the one or more UE(s), the RSRP value(s), and the RSRQ value(s) measured by the one or more UE(s). In an embodiment, the PCICM value may be adjusted based on a comparison between the received RSRP value(s) and RSRQ value(s) with a pre-defined threshold RSRP value ($RSRP_{th}$) and a threshold RSRQ value ($RSRQ_{th}$), respectively. Below is a sample pseudo code that may be executed by the Measurement Report Analysis unit 316a to perform the aforementioned mentioned steps.

For each $i_{th}$ UE in SBS coverage area where (1<i<UE_NUM)
PCDRM may extract RSRP of SBS and store it as UE-SBS$_i$=<i, RSRP>
(UE-SBSi→SBS details as perceived by the ith UE)

For each $j_{th}$ NBS of overlapping coverage of SBS where (<i<SBS_NUM)
a) The MRA 316a retrieves Neighbor PCI ($NBS_{PCI}$) and Check if $NBS_{PCI}$=$SBS_{PCI}$ (Where $SBS_{PCI}$ is the PCI value of the SBS)
b) If true MRA 316a extracts RSRP and RSRQ of NBS and store as UE-NBSj=<NBSPCI, <RSRP, RSRQ>> and go to step (c)
c) MRA 316a determines number of UEs reported the same PCI as UEnum_PCI UEnum_PCI+1
d) MRA 316a of SBS keeps NBS-details including RSRP and RSRQ into memory UE-SBSi=<i, NBSj> and store RSRP as P=RSRP The Measurement Report Analysis unit 316a after performing the above steps may send the analyzed measurement report and determined parameters to PCI Collision detection (PCD) 316b through the C2 connection. In an embodiment, the PCI collision detection unit 316b may receive the analyzed measurement report from the Measurement Report Analysis unit 316a and may be configured to detect a PCI collision among a plurality of base stations based on the determined PCICM value. The plurality of base stations may include a Serving Base Station (SBS) 102 and one or more Neighboring Base Stations (NBS) 104.

Below is a sample pseudo code that may be executed by the PCI Collision detection unit (PCD) 316b to perform the aforementioned mentioned steps.

For each UE in SBS ($UE_i$): (1 . . . UE_NUM)
For each NBS ($NBS_j$): (1 . . . SBS_NUM)
a. PCD 316b of SBS retrieves Neighbor PCI value ($NBS_{PCI}$)
b. PCD 316b checks if the SBS and NBS PCI value is same ($NBS_{PCI}$=$SBS_{PCI}$ is true)
c. If $NBS_{PCI}$=$SBS_{PCI}$ then PCD 316b extracts RSRP and RSRQ values of each relevant NBS as UE-NBS (j, RSRP) and UE-NBS (j, RSRQ) from <$NBS_{PCI}$, <RSRP, RSRQ>>) and keeps it in its memory as I=RSRP
d. PCD 316b determines environment noise as N
e. PCD 316b determines effective interference $INTRF_{eff}$ Using SINR=P/(I+N)

In an embodiment, PCI collision among the plurality of base stations may be detected when the difference between an effective interference (INTRFeff) and an interference margin (INTRFmargin) is greater than a threshold interference margin (INTRFmarginTH). For example, the PCI Collision detection unit 316b may check if INTRFeff>INTRFmargin of PCDRMConfig-LC, then PCDRM detects $SBS_{PCI}$ as collided PCI. In an embodiment, when the PDCRM detects the $SBS_{PCI}$ as the collided PCI then the PCDRM 316 may shift the execution to PCI Determination Unit 316d when (INTRFeff−INTRFmargin)> INTRFmarginTH. In an embodiment, when the PCI Collision detection unit 316b detects the $SBS_{PCI}$ as the collided PCI then the PCDRM may shift the execution to PCI Determination Unit 316d when PCDRM finds ($INTRF_{eff}$−$INTRF_{margin}$)<=$INTRF_{marginTH}$.

In an embodiment, when no PCI collision is detected by the PCI Collision detection unit 316b the PCDRM 316 may shift the execution to the Measurement Report Analysis unit 316a. In an embodiment, the PCDRM 316 may send the PCI collision information to Interference Margin Adjustment Unit 316c through the C3 connection. In an embodiment, the Interference Margin Adjustment Unit 316c may receive the PCI Collision detection information from the PCI Collision detection unit 316b. In an embodiment, detecting the PCI collision among the plurality of base stations is done when the difference between an effective interference (INTRFeff) and an interference margin (INTRFmargin) is greater than a threshold interference margin (INTRFmarginTH). In an embodiment, the PCDRM 316 may send the updated threshold interference margin to PCI Determination Unit 316d through the C4 connection for PCI re-use. In an embodiment, the Interference Margin Adjustment Unit 316c may be configured to determine determining average interference (INTRFavg) for the RSRP value(s). Below is a sample pseudo code that may be executed by the Interference Margin Adjustment Unit 316c to perform the aforementioned mentioned steps on receiving PCI Collision detection information from the PCI Collision detection unit 316b.

For each $i_{th}$ UE in UE-SBS, (1 ... UE_NUM)
    For each $j_{th}$ NBS in NBS$_j$ (I ... SBS_NUM)
      a. IMA 316c determines Interference INTRF$_{(UE-SBSi,\ UE-NBSj)}$ using SINR=P/(I+N)
      b. IMA 316c determines RSRP category as per Table 1 given below.
      c. IMA 316c determines average interference INTRF$_{avg}$=AVG(INTRF$_{(UE-SBSi,\ UE-NBSj)}$) for the categorized RSRP.
      d. IMA 316c checks if INTRF$_{avg}$>INTRF$_{margin}$ for the respective categorized RSRP
      e. If true then IMA 316c assigns INTRF$_{margin}$=INTRF$_{(UE-SBSi,\ UE-NBSj)}$

TABLE 1

Sample measurement report

| Reported value | Measured Quantity value | Unit |
|---|---|---|
| RSRP_00 | RSRP<−140 | dBm |
| RSRP_01 | −140 < RSRP < −139 | dBm |
| RSRP_02 | −139 <= RSRP < −138 | dBm |
| ... | ... | ... |
| RSRP_97 | −44<=RSRP | dBm |
| RSRQ_00 | RSRQ<−19.5 | dB |
| RSRQ_01 | −19.5 <= RSRQ < −19 | dB |
| RSRQ_02 | −19 < RSRQ < −18.5 | dB |
| ... | ... | ... |
| RSRQ_00 | −3<=RSRQ | dB |

In an embodiment, the Interference Margin Adjustment Unit 316c may be configured to calculated the SINR value based on the number of UE 110, the relative distance, and the interference margin. For example, the calculated SINR values may be represented in the form of table 2 as shown below.

TABLE 2

SINR values

| Calculated SNR | Number of UEs | Relative Distance based on Effective RSRP and RSRQ | Interference Margin |
|---|---|---|---|
| SINR1 | UE1 | DistRel1 | INTFRmargin1 |
| SINR2 | UE2 | DistRel2 | INTFRmargin2 |
| SINR3 | UE3 | DistRel3 | INTFRmargin3 |
| ... | ... | ... | ... |
| SINRn | UEn | DistRelN | INTFRmarginN |

After detecting the PCI collision among the plurality of base stations, the PCI Determination Unit 316d may be configured to estimate the relative distance between the SBS 102 and each of the one or more NBS 104 is based on the reference signal received power (RSRP) value and the reference signal received quality (RSRQ) value measured by one or more User Equipment (UE)(s) for each of the one or more NBS. Below is a sample pseudo code that may be executed by the PCI Determination Unit 316d to perform the aforementioned mentioned steps.

For each $i_{th}$ UE in SBS, (1 ... UE_NUM)
    For each $j_{th}$ NBS in NBS$_j$ (1 ... SBS_NUM)
      a. PD 316d retrieves RSRP of each Neighbor as NBS$_{RSRQ}$ if NBS$_{RSRQ}$>RSRP$_{th}$ and RSRP of SBS as SBS$_{RSRP}$
      b. PD 316d retrieves RSRQ of each Neighbor as NBS$_{RSRP}$ if NBS$_{RSRP}$ RSRQ$_{th}$ and RSRQ of SBS as SBS$_{RSRQ}$
      c. PD 316d determines Max diff of RSRP RSRP$_{max}$=Max (UE-NBS$_j$, NBS$_{RSRP}$) between two neighbors NBS$_j$ and NBS$_{j+1}$
      d. PD 316d determines Max diff of RSRQ RSRQ$_{max}$=Max (UE-NBS$_j$, NBS$_{RSRQ}$) between two neighbors NBS$_j$ and NBS$_{j+1}$
      e. PD 316d selects two neighbors NBS$_k$ and NBS$_l$. PCI value for reuse based on Max diff of RSRP$_{max}$ and Max diff of RSRQ$_{max}$.
      f. PD 316d determines difference of serving RSRP with RSRP of two neighbors as RSRP$_{diff(k)}$=|SBS$_{RSRP}$−NBS$_{RSRP(k)}$|and RSRP$_{diff(l)}$=|SBS$_{RSRP}$−NBS$_{RSRP(l)}$|
      g. PD 316d determines difference of serving RSRQ with RSRQ of two neighbors as RSRQ$_{diff(k)}$=|SBS$_{RSRQ}$−NBS$_{RSRQ(k)}$|and RSRQ$_{diff(l)}$=|SBS$_{RSRQ}$−NBS$_{RSRQ(l)}$|
      h. PD 316d determines Max diff of RSRP RSRP$_{maxdiff}$=MaxDiff(RSRP$_{diff(k)}$, RSRP$_{diff(l)}$)
      i. PD 316d determines Max diff of RSRP RSRQ$_{maxdiff}$=MaxDiff(RSRQ$_{diff(l)}$, RSRQ$_{diff(l)}$).
      j. PD 316d determines effective RSRP RSRP$_{eff}$=RSRP$_{mandiff}$*RSRP$_{Weightage}$
      k. PD 316d determines effective RSRQ RSRQ$_{eff}$=RSRQ$_{maxdiff}$*RSRQ$_{Weightage}$
Where RSRP$_{Weightage}$ and RSRQ$_{Weightage}$ are dynamically configurable
      1. PD 316d checks if (RSRP$_{eff}$>RSRQ$_{eff}$). If true PCDRM then select corresponding PCI else select another PCI as PCI$_{Final}$.

After estimating the relative distance, the PD 316d may reconfigure a new PCI value associated with the SBS 102 based on the estimated relative distance. In an embodiment, the new PCI value for the SBS 102 may be selected from at least one NBS 104 among a plurality of NBS(s) 104 for which an effective RSRP value is greater than an effective RSRQ value. In an embodiment, the reconfiguring of the new PCI value may include selecting a temporary PCI value from one of PCI values associated with the plurality of NBS 104. In an embodiment, the PCDRM 216 may determine whether the selected temporary PCI value resolves the detected PCI collision based on a maximum difference in RSRP values and a maximum difference in RSRQ values. In an embodiment, the PD 316d may on determination of resolution of the collision by the selected temporary PCI value, assign the temporary PCI as the new PCI value to the SBS 102.

In an embodiment, the PCI Determination Unit 316d may send the determined new PCI value for re-use to the Transmission Power Determination Unit for determining maximum transmission power TXPowMAX$_{Final}$ through the C5 connection. In an embodiment, in accordance to the present invention the PCI Determination Unit 316d may perform the determining of a maximum power transmit (TXPowMAX$_{Final}$) for the SBS with the new PCI value based on a threshold received power (µTH$_{CELL}$) and a power hysteresis (ΔTH_CELL). In an example the PCI Determination Unit 316d may determine the Maximum Transmission Power (TXPowMAX$_{FINAL}$) by performing the following steps: — a. PD 316*d* receives transmission power from the Neighbor Base Station of same PCI as $PCI_{Final}$.
b. PD 316*d* determines the Path Loss of the received RSRP for this Neighbor Base Station.
c. PD 316*d* determines the effective distance based on Threshold Received Power ($\mu TH_{CELL}$)
d. PD 316*d* determines the maximum power transmit $TXPowMAX_{Final}$ of the NBS with the same PCI considering power hysteresis $\Delta_{TH\_CELL}$ In an embodiment, the PCDRM 316 may send the determined new PCI value to management application through C6 connection. In an embodiment, the PCDRM 316 may report the $TXPowMax_{Final}$ to the Management Application of the Management Subsystem 206.

A person having ordinary skill in the art will appreciate that the scope of the disclosure is not limited to the one or more unique features that have been described herein. Further, the examples provided in supra are for illustrative purposes and should not be construed to limit the scope of the disclosure.

Figure 4:
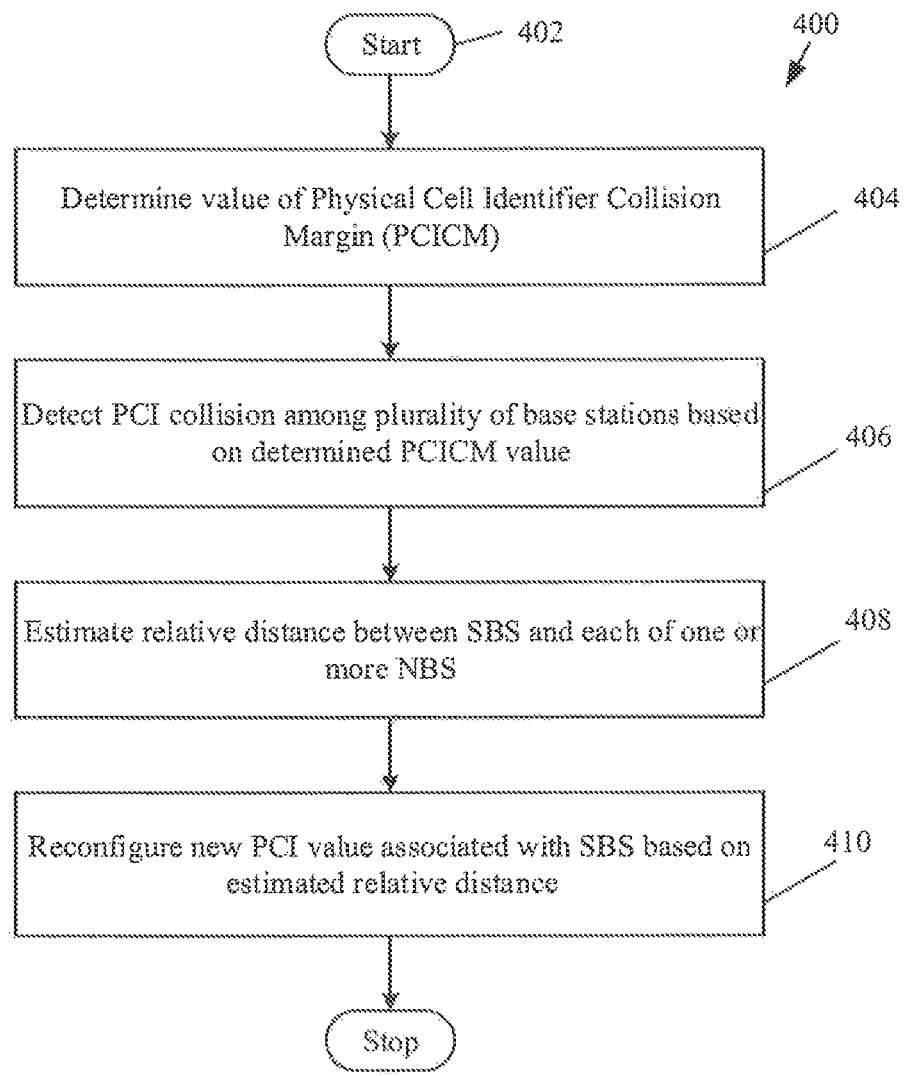
FIG. 4 is a flowchart illustrating a method for resolution of collision of Physical Cell Identifier (PCI) between a plurality of base stations, in accordance with some embodiments of the present disclosure.

FIG. 4 is a flowchart illustrating a method 400 for resolution of collision of Physical Cell Identifier (PCI) between a plurality of base stations. The method starts at step 402 and proceeds to step 404. At step 404, the PCI Collision Detection and Resolution Module (PCDRM) 316 may determine a value of a Physical Cell Identifier Collision Margin (PCICM). At step 406, the PCDRM 316 may detect a PCI collision among a plurality of base stations based on the determined PCICM value. In an embodiment, the plurality of base stations may include a Serving Base Station (SBS) 102 and one or more Neighboring Base Stations (NBS) 104. At step 408, the PCDRM 316 may estimate a relative distance between the SBS 102 and each of the one or more NBS 104. At step 410, the PCDRM 316 may reconfigure a new PCI value associated with the SBS 102 based on the estimated relative distance.

Computer System

FIG. 5 illustrates a block diagram of an exemplary computer system for implementing embodiments consistent with the present disclosure. Variations of computer system 501 may be used for performing optical character recognition on an image including a plurality of printed characters. The computer system 501 may include a central processing unit ("CPU" or "processor") 502. Processor 502 may include at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HI-SPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor. OPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n. Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 510, 511, and 512. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

One of the advantages of the disclosed method and system is that an effective PCI Collision Detection and Resolution mechanism to minimize inter-cell (Inter Base Station) interference is achieved. In an embodiment, the system does not depend upon an X2 connection for the detection of PCI collision. The system and method of the present invention mitigates the problem of unnecessary PCI reconfiguration at an SBS 102. PCI collision detection according to the disclosure does not depend only on the signal strength received from different neighbor cells. In an embodiment, the present disclosure overcomes disadvantages of the existing systems of PCI allocation based on the PSS and SSS values only which does not provide the guarantee that the interference between Cells will be minimum. An advantage of the disclosed system and method is that it may reconfigure the SBS 102 with a PCI value having the minimum interference compared to the other NBS 104. Another advantage is that when PCI collision happens then the present disclosure may resolve it with minimum impact on service to the UE (s). Such and other advantages will be apparent to a person skilled in the art.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that may include a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

I claim:

1. A method for resolution of collision of Physical Cell Identifier (PCI) between a plurality of base stations, the method comprising:
   determining, by a PCI Collision Detection and Resolution Module (PCDRM), a value of a Physical Cell Identifier Collision Margin (PCICM);
   detecting, by the PCDRM, a PCI collision among a plurality of base stations based on the determined PCICM value, wherein the plurality of base stations comprises a Serving Base Station (SBS) and one or more Neighboring Base Stations (NBS);
   estimating, by the PCDRM, a relative distance between the SBS and each of the one or more NBS; and
   reconfiguring, by the PCDRM, a new PCI value associated with the SBS based on the estimated relative distance, wherein the new PCI value for the SBS is selected from at least one NBS among a plurality of NBS(s) for which an effective reference signal received power (RSRP) value is greater than an effective reference signal received quality (RSRQ) value.

2. The method of claim 1, wherein estimating the relative distance between the SBS and each of the one or more NBS is based on a reference signal received power (RSRP) value and a reference signal received quality (RSRQ) value measured by one or more User Equipment (UE)(s) for each of the one or more NBS.

3. The method of claim 2, wherein the determination of the value of PCICM is based on a distribution of the one or more UE(s), the RSRP value(s), and the RSRQ value(s) measured by the One or more UE(s).

4. The method of claim 2, further comprising:
   receiving the RSRP value(s) and the RSRQ value(s) from the one or more UE(s);
   comparing the received RSRP value(s) and RSRQ value(s) with a pre-defined threshold RSRP value (RSRPth) and a threshold RSRQ value (RSRQth), respectively; and
   adjusting the PCICM value based on the comparison.

5. The method of claim 2, further comprising determining average interference (INTRFavg) for the RSRP value(s).

6. The method of claim 1, wherein the reconfiguring of the new PCI value comprises:
   selecting a temporary PCI value from one of PCI values associated with the plurality of NBS;
   determining whether the selected temporary PCI value resolves the detected collision based on a maximum difference in RSRP values and a maximum difference in RSRQ values, wherein on determination of resolution of the collision, the selected temporary PCI value is assigned as the new PCI value to the SBS.

7. The method of claim 1 wherein, detecting the PCI collision among the plurality of base stations is done when the difference between an effective interference (INTRFeff) and an interference margin (INTRFmargin) is greater than a threshold interference margin (INTRFmarginTH).

8. The method of claim 1, further comprising determining a maximum power transmit (TXPowMax$_{Final}$) for the SBS with the new PCI value based on a threshold received power ($\mu TH_{CELL}$) and a power hysteresis ($\Delta TH\_CELL$).

9. A system for resolution of collision of Physical Cell Identifier (PCI) between a plurality of base stations, the system comprising:
   a processor; and
   a memory communicatively coupled to the processor, wherein the memory stores processor instructions, which, on execution, causes the processor to:
   determine a value of a Physical Cell Identifier Collision Margin (PCICM);
   detect a PCI collision among a plurality of base stations based on the determined PCICM value, wherein the plurality of base stations comprises a Serving Base Station (SBS) and one or more Neighbouring Base Stations (NBS);
   estimate a relative distance between the SBS and each of the one or more NBS; and
   reconfigure a new PCI value associated with the SBS based on the estimated relative distance, wherein the new PCI value for the SBS is selected from at least one NBS among a plurality of NBS(s) for which an effective reference signal received power (RSRP) value is greater than an effective reference signal received quality (RSRQ) value.

10. The system of claim 9, wherein estimating the relative distance between the SBS and each of the one or more NBS is based on a reference signal received power (RSRP) value and a reference signal received quality (RSRQ) value measured by one or more User Equipment (UE)(s) for each of the one or more NBS.

11. The system of claim 10, wherein the determination of the value of PCICM is based on a distribution of the one or more UE(s), the RSRP value(s), and the RSRQ value(s) measured by the one or more UE(s).

12. The system of claim 10, wherein the processor is further configured to:
   receive the RSRP value(s) and the RSRQ value(s) from the one or more UE(s);
   compare the received RSRP value(s) and RSRQ value(s) with a pre-defined threshold RSRP value ($RSRP_{th}$) and a threshold RSRQ value ($RSRQ_{th}$), respectively; and
   adjust the PCICM value based on the comparison.

13. The system of claim 10, wherein the processor is further configured to determine average interference (INTRFavg) for the RSRP value(s).

14. The system of claim 9, wherein the reconfiguring of the new PCI value comprises:
   selecting a temporary PCI value from one of PCI values associated with the plurality of NBS;
   determining whether the selected temporary PCI value resolves the detected collision based on a maximum difference in RSRP values and a maximum difference in RSRQ values, wherein on determination of resolution of the collision, the selected temporary PCI value is assigned as the new PCI value to the SBS.

15. The system of claim 9, wherein, detecting the PCI collision among the plurality of base stations is done when the difference between an effective interference (INTRFeff) and an interference margin (INTRFmargin) is greater than a threshold interference margin (INTRFmarginTH).

16. The system of claim 9, further comprising determining a maximum power transmit ($TXPowMax_{Final}$) for the SBS with the new PCI value based on a threshold received power ($\mu TH_{CELL}$) and a power hysteresis ($\Delta TH\_CELL$).

17. A non-transitory computer-readable storage medium having stored thereon, a set of computer-executable instructions for causing a computer comprising one or more processors to perform steps comprising:
   determining a value of a Physical Cell Identifier Collision Margin (PCICM);
   detecting a Physical Cell Identifier (PCI) collision among a plurality of base stations based on the determined PCICM value, wherein the plurality of base stations comprises a Serving Base Station (SBS) and one or more Neighbouring Base Stations (NBS);
   estimating a relative distance between the SBS and each of the one or more NBS; and
   reconfiguring a new PCI value associated with the SBS based on the estimated relative distance, wherein the new PCI value for the SBS is selected from at least one NBS among a plurality of NBS(s) for which an effective reference signal received power (RSRP) value is greater than an effective reference signal received quality (RSRQ) value.

* * * * *